United States Patent
Cai

(10) Patent No.: US 9,574,112 B2
(45) Date of Patent: Feb. 21, 2017

(54) HOT-MELT POLYESTER TAPE AND PREPARATION METHOD THEREOF

(71) Applicant: HANGZHOU LINAN TIANHONG TELECOMMUNICATION MATERIAL CO., LTD., Hangzhou (CN)

(72) Inventor: Shengyue Cai, Hangzhou (CN)

(73) Assignee: HANGZHOU LINAN TIANHONG TELECOMMUNICATIONS MATERIAL CO., LTD. (CN)

(*) Notice: Subject to any disclaimer, the term of this patent is extended or adjusted under 35 U.S.C. 154(b) by 0 days.

(21) Appl. No.: 14/673,897

(22) Filed: Mar. 31, 2015

(65) Prior Publication Data

US 2016/0177137 A1 Jun. 23, 2016

(30) Foreign Application Priority Data

Dec. 18, 2014 (CN) .......................... 2014 1 0794893

(51) Int. Cl.
*B05D 1/18* (2006.01)
*C09J 7/02* (2006.01)

(52) U.S. Cl.
CPC ............... *C09J 7/0285* (2013.01); *B05D 1/18* (2013.01); *C09J 2201/61* (2013.01); *C09J 2203/302* (2013.01)

(58) Field of Classification Search
CPC .......................................................... C09J 7/02
See application file for complete search history.

(56) References Cited

U.S. PATENT DOCUMENTS 5,922,166 A * 7/1999 Dillon ................. B32B 37/0053
156/324.4

* cited by examiner

*Primary Examiner* — Xiao Zhao
(74) *Attorney, Agent, or Firm* — Schmeiser, Olsen & Watts, LLP

(57) ABSTRACT

A hot-melt polyester tape and a preparation method thereof is provided, the hot-melt polyester tape comprises a PET film layer which has a thickness of 10-20 μm, and one side of the PET film layer is coated with a hot-melt glue layer which has a thickness of 2-5 μm; the preparation method thereof comprises sizing, curing, slitting and winding formation. The hot-melt polyester tape of the invention has the PET film layer and the hot-melt glue layer, and such hot-melt polyester tape is added with a layer of hot-melt glue compared to a conventional PET film, which makes it have higher extension capacity and not easy to break, the extension strength is much higher than the national standard, and the hot-melt polyester tape has the functions of waterproofing and reinforcement.

6 Claims, 3 Drawing Sheets

HOT-MELT POLYESTER TAPE AND PREPARATION METHOD THEREOF

TECHNICAL FIELD

The following relates to a hot-melt polyester tape and a preparation method thereof.

BACKGROUND

Commercially-available thick cables generally contain a plurality of thin wires, which are compactly wrapped up and separated from each other with a thin layer of insulation skin. If the partial insulation skin is damaged due to inattention during use, the whole wire may have a problem and even burn out. In order to avoid above problems, there is a need to wrap these thinner wires with a layer of protective films when fabricating such wires. This protective film is usually insulating film, this protective film has a large coil diameter when it is finally wound during production, which brings inconvenience to production, and meanwhile there is a need to equip a tape inverter, for handling the protective film coils which may have a bad winding formation or parallel rewinding of the protective film coils into portable forms.

SUMMARY OF THE INVENTION

In order to solve technical problems described above, the following provides a hot-melt polyester tape and a preparation method thereof, due to its hot-melt glue layer, the hot-melt polyester tape has characteristics of waterproofing and improving its extension capacity, and the preparation method has advantages of saving processes, ease of operating, high efficiency and stable quality of produced products.

The hot-melt polyester tape of the invention comprises a PET film layer which has a thickness of 10-20 μm, and one side of the PET film layer is coated with a hot-melt glue layer which has a thickness of 2-5 μm.

The hot-melt polyester tape provided in the present technical solution has a PET film layer and a hot-melt glue layer, and such hot-melt polyester tape is added with a layer of hot-melt glue compared to a conventional PET film, which makes it have higher extension capacity and have the functions of waterproofing and reinforcement.

Further, the preparation method of the hot-melt polyester tape comprises the steps:

1) putting the PET film on a PET film roller of a dry laminating machine, drawing the PET film to allow one side of the PET film to pass through a glue bucket containing liquid hot-melt glue layer, and smearing the PET film with the liquid hot-melt glue layer;

2) drying the PET film smeared with the liquid hot-melt glue layer obtained in the step 1) through a drying tunnel of the dry laminating machine to obtain a semi-finished product, wherein the drying tunnel has 4 heating zones inside, in which the temperature of the first two heating zones is 55-65° C., and heaters in the latter two heating zones are turned off;

3) bringing the semi-finished product dried in the step 2) into a discharge shaft to collect semi-finished product coils;

4) putting the semi-finished product coils obtained in the step 3) into a slitter to slit to a desired width;

5) bringing the semi-finished product slit in the step 4) into a multi-head winder to parallel wind into finished product coils;

6) putting the finished product coils below standard in the step 5) into a single-head winder to unwind and then rewind parallel into finished product coils.

The preparation method of the present technical solution is to adhere a hot-melt glue layer to one side of the PET film layer, dry the hot-melt glue and then wind and slit, followed by parallel winding the slit semi-finished product into the finished product coils by a multi-head winder, removing if the winding effect is poor, inverting the tape on a single-head winder and parallel rewinding into the finished product coils; wherein the temperature of the drying tunnel is beneficial to volatilization of solvent substances of the liquid hot-melt glue layer.

Further, the multi-head winder in the step 5) includes a first machine cabinet, a plurality of first spindles and a plurality of first reciprocating mechanisms are mounted on the first machine cabinet, the first spindles and the first reciprocating mechanisms operate cooperatively, a first tension arm is movably mounted on a movable channel of the first reciprocating mechanism, and the other end of the first tension arm is in contact with the first spindle through a first arm roll shaft mounted on the first tension arm; the first machine cabinet is also mounted with a plurality of first tension rockers cooperatively used with the first spindles, and the first tension rockers are mounted with first roker roll shafts capable of moving along the first tension rockers; a plurality of first guide wheels are mounted on the first machine cabinet, and the first guide wheels are connected with the first roker roll shafts through winding objects; a first HMI operation screen is also mounted on the first machine cabinet.

The multi-head winder of the present technical solution has the roles of simultaneously winding a plurality of winding objects, and parallel winding the winding objects and rendering the formed finished product coils to have small volumes and portability.

Further, the numbers of the spindles, the reciprocating mechanisms, the tension rockers and the guide wheels are the same; the guide wheels are mounted on the top of the electric cabinet.

Further, the single-head winder in the step 6) includes a second machine cabinet, and the second machine cabinet is mounted with a second upper spindle, a second lower spindle, a second upper tension rocker, a second lower tension rocker, a second reciprocating mechanism and a second guide roller, the second upper spindle operates cooperatively with the second upper tension rocker and the second reciprocating mechanism, a second tension arm is movably mounted on a movable channel of the second reciprocating mechanism, and the other end of the second tension arm is in contact with the second upper spindle through a second arm roll shaft mounted on the second tension arm, and the second upper tension rocker is mounted with a second upper roker roll shaft capable of moving along the second upper tension rocker; the second lower spindle operates cooperatively with the second lower tension rocker and the second guide roller, and the second lower tension rocker is mounted with a second lower roker roll shaft capable of moving along the second lower tension rocker; the second machine cabinet is also mounted with a second upper guide wheel, a second lower guide wheel and a second guide wheel set connecting the second upper guide wheel and the second lower guide wheel, the second upper guide wheel is connected with the second upper roker roll shaft through winding objects, and the second lower guide wheel is connected with the second lower roker roll shaft through winding objects; a second HMI operation screen is also mounted on the second machine cabinet.

The single-head winder of the present technical solution has the roles of inverting tape and parallel winding, can invert and parallel rewind the finished product coils which are not wound well in the multi-head winder, and can also invert and parallel rewind the spindle ever wound by the winder, and render the formed finished product coils to have advantages of small volumes and portability.

Further, the second guide wheel set includes more than three guide wheels.

A hot-melt polyester tape of the invention has the PET film layer and the hot-melt glue layer, and such hot-melt polyester tape is added with a layer of hot-melt glue compared to a conventional PET film, which makes it have higher extension capacity and not easy to break, the extension strength is much higher than the national standard, and the hot-melt polyester tape has the functions of waterproofing and reinforcement; the preparation method of the invention has effects of saving processes, ease of use, low production cost, improved benefit and stable quality, directly utilizes a multi-head winder or a single-head winder to parallel wind, and renders the resulting hot-melt polyester tape coil to have reduced volume and improved portability.

BRIEF DESCRIPTION OF THE DRAWINGS

Some of the embodiments will be described in detail, with reference to the following figures, wherein like designations denote like members, wherein.

DESCRIPTION OF THE PREFERRED EMBODIMENTS

In order to readily understand the technical means realized in the invention, creative features, achieved goals and efficacies, the invention will be further elaborated in conjunction with specific embodiments as below.

Embodiment 1

Figure 1:
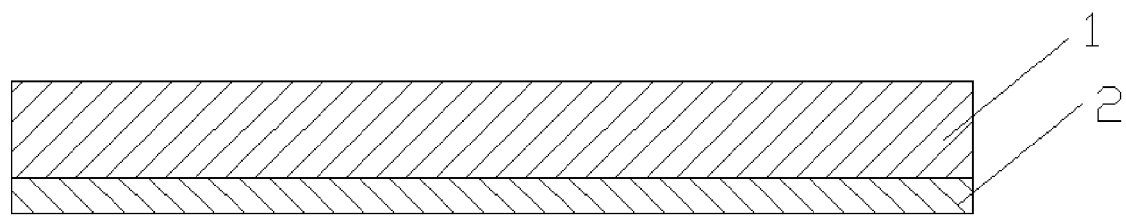
FIG. 1 is a structural schematic diagram of a hot-melt polyester tape of the invention.
Figure 2:
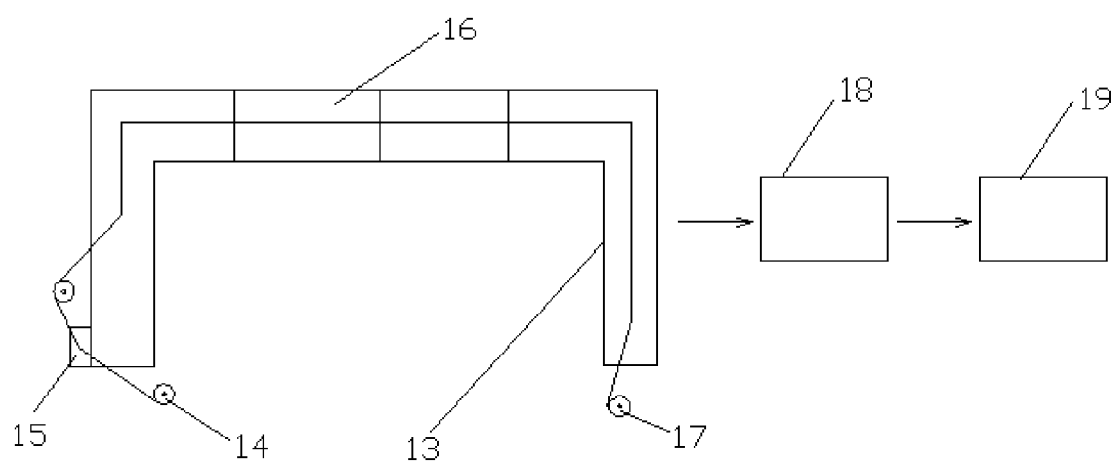
FIG. 2 is a structural schematic diagram of the preparation method of Embodiment 1.

As shown in FIGS. 1 and 2, a hot-melt polyester tape comprises a PET film layer 1 which has a thickness of 10 μm, and one side of the PET film layer 1 is coated with a hot-melt glue layer 2 which has a thickness of 2 μm.

A preparation method of the hot-melt polyester tape comprises the steps:

1) putting the PET film on a PET film roller 14 of a dry laminating machine 13, drawing the PET film to allow one side of the PET film to pass through a glue bucket 15 containing liquid hot-melt glue layer, and smearing the PET film with the liquid hot-melt glue layer;

2) drying the PET film smeared with the liquid hot-melt glue layer obtained in the step 1) through a drying tunnel 16 of the dry laminating machine 13 to obtain a semi-finished product, wherein the drying tunnel 16 has 4 heating zones inside, in which the temperature of the first two heating zones is 55° C., and heaters in the latter two heating zones are turned off;

3) bringing the semi-finished product dried in the step 2) into a discharge shaft 17 to collect semi-finished product coils;

4) putting the semi-finished product coils obtained in the step 3) into a slitter 18 to slit to a desired width;

5) bringing the semi-finished product slit in the step 4) into a multi-head winder 19 to parallel wind into finished product coils.

Figure 4:
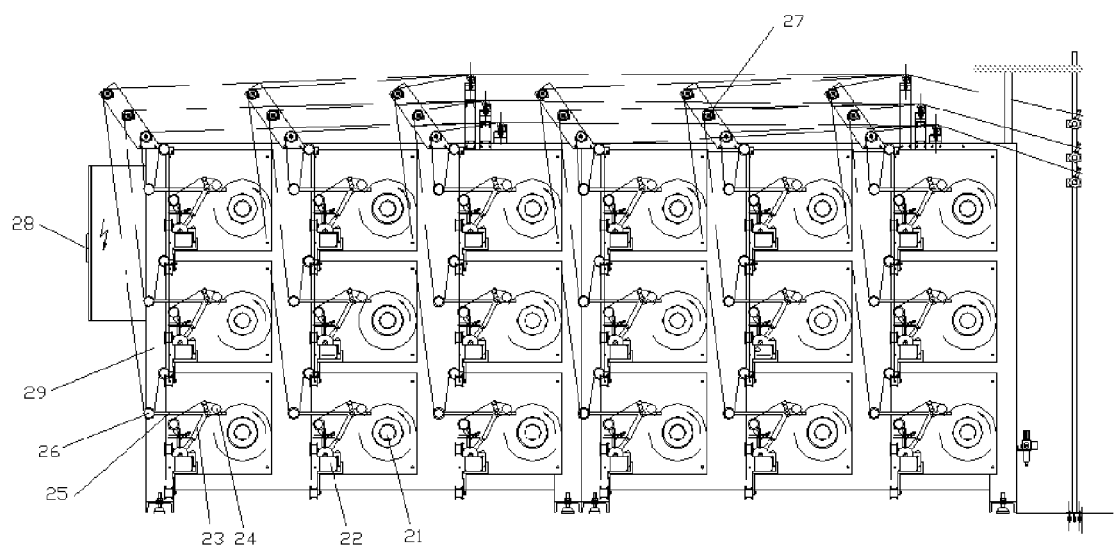
FIG. 4 is a structural schematic diagram of a multi-head winder.

The multi-head winder 19 of the step 5) (see FIG. 4) includes a first machine cabinet 29, a plurality of first spindles 21 and a plurality of first reciprocating mechanisms 22 are mounted on the first machine cabinet 20, the first spindles 21 and the first reciprocating mechanisms 22 operate cooperatively, a first tension arm 23 is movably mounted on a movable channel of the first reciprocating mechanism 22, and the other end of the first tension arm 23 is in contact with the first spindle 21 through a first arm roll shaft 24 mounted on the first tension arm 23; the first machine cabinet 29 is also mounted with a plurality of first tension rockers 25 cooperatively used with the first spindles 21, and the first tension rockers 25 are mounted with first roker roll shafts 26 capable of moving along the first tension rockers 25; a plurality of first guide wheels 27 are mounted on the top of the first machine cabinet 29, and the first guide wheels 27 are connected with the first roker roll shafts 26 through winding objects; a first HMI operation screen 28 is also mounted on the first machine cabinet 29. The numbers of the spindles 21, the reciprocating mechanisms 22, the first tension rockers 25 and the first guide wheels 27 are the same.

A hot-melt polyester tape of this Embodiment has the PET film layer and the hot-melt glue layer, and such hot-melt polyester tape is added with a layer of hot-melt glue compared to a conventional PET film, which makes it have higher extension capacity and not easy to break, the extension strength is much higher than the national standard, and the hot-melt polyester tape has the functions of waterproofing and reinforcement; the preparation method of the invention has effects of saving processes, ease of use, low production cost, improved benefit and stable quality, directly utilizes a multi-head winder or a single-head winder to parallel wind, and renders the resulting hot-melt polyester tape coil to have reduced volume and improved portability.

Embodiment 2

Figure 3:
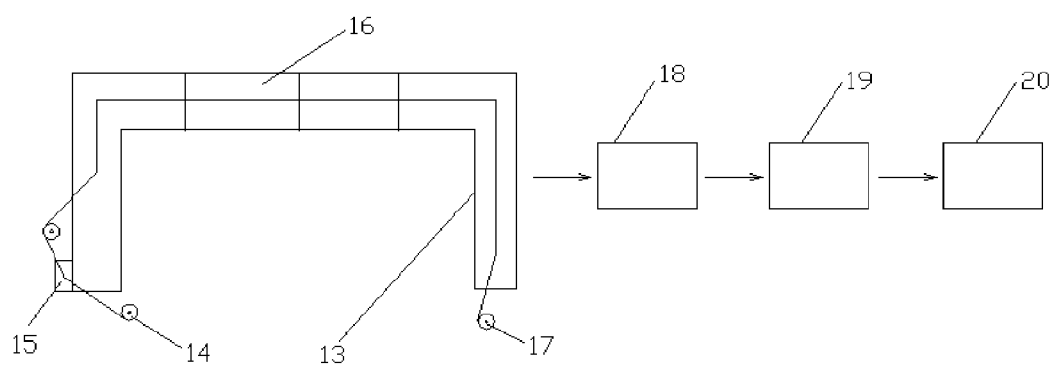
FIG. 3 is a structural schematic diagram of the preparation method of Embodiment 2 or 3.

As shown in FIGS. 1 and 3, a hot-melt polyester tape comprises a PET film layer 1 which has a thickness of 20 μm, and one side of the PET film layer 1 is coated with a hot-melt glue layer 2 which has a thickness of 5 μm.

A preparation method of the hot-melt polyester tape comprises the steps:

1) putting the PET film on a PET film roller 14 of a dry laminating machine 13, drawing the PET film to allow one side of the PET film to pass through a glue bucket 15 containing liquid hot-melt glue layer, and smearing the PET film with the liquid hot-melt glue layer;

2) drying the PET film smeared with the liquid hot-melt glue layer obtained in the step 1) through a drying tunnel 16 of the dry laminating machine 13 to obtain a semi-finished product, wherein the drying tunnel 16 has 4 heating zones inside, in which the temperature of the first two heating zones is 65° C., and heaters in the latter two heating zones are turned off;

3) bringing the semi-finished product dried in the step 2) into a discharge shaft 17 to collect semi-finished product coils;

4) putting the semi-finished product coils obtained in the step 3) into a slitter 18 to slit to a desired width;

5) bringing the semi-finished product slit in the step 4) into a multi-head winder 19 to parallel wind into finished product coils;

6) putting the finished product coils below standard in the step 5) into a single-head winder 20 to unwind and then rewind parallel into finished product coils.

The multi-head winder 19 of the step 5) (see FIG. 4) includes a first machine cabinet 20, a plurality of first spindles 21 and a plurality of first reciprocating mechanisms 22 are mounted on the first machine cabinet 20, the first spindles 21 and the first reciprocating mechanisms 22 operate cooperatively, a first tension arm 23 is movably mounted on a movable channel of the first reciprocating mechanism 22, and the other end of the first tension arm 23 is in contact with the first spindle 21 through a first arm roll shaft 24 mounted on the first tension arm 23; the first machine cabinet 20 is also mounted with a plurality of first tension rockers 25 cooperatively used with the first spindles 21, and the first tension rockers 25 are mounted with first roker roll shafts 26 capable of moving along the first tension rockers 25; a plurality of first guide wheels 27 are mounted on the top of the first machine cabinet 29, and the first guide wheels 27 are connected with the first roker roll shafts 26 through winding objects; a first HMI operation screen 28 is also mounted on the first machine cabinet 29. The numbers of the spindles 21, the reciprocating mechanisms 22, the first tension rockers 25 and the first guide wheels 27 are the same.

Figure 5:
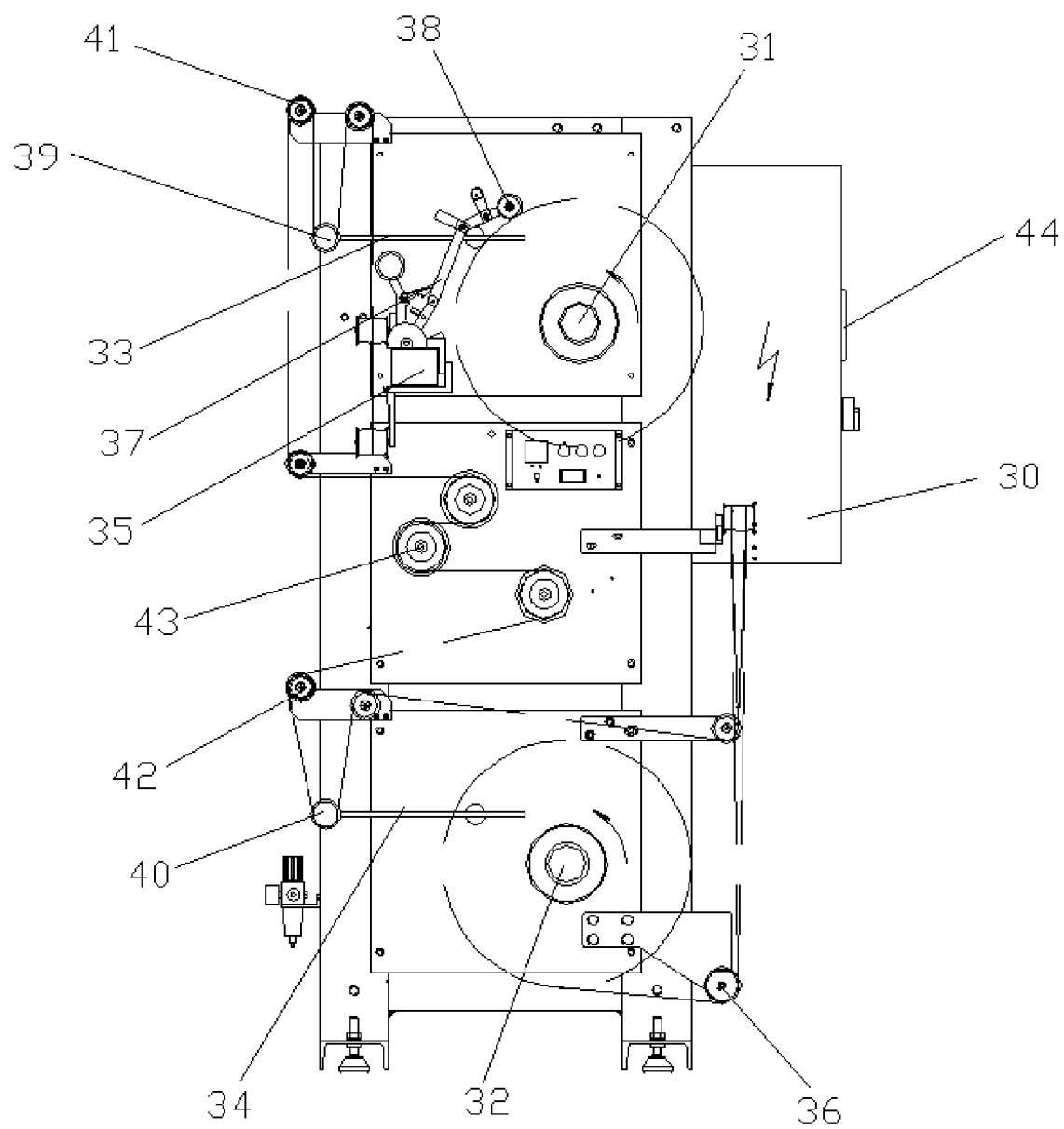
FIG. 5 is a structural schematic diagram of a single-head winder.

The single-head winder 20 of the step 6) (see FIG. 5) includes a second machine cabinet 30, and the second machine cabinet 30 is mounted with a second upper spindle 31, a second lower spindle 32, a second upper tension rocker 33, a second lower tension rocker 34, a second reciprocating mechanism 35 and a second guide roller 36, the second upper spindle 31 operates cooperatively with the second upper tension rocker 33 and the second reciprocating mechanism 35, a second tension arm 37 is movably mounted on a movable channel of the second reciprocating mechanism 35, and the other end of the second tension arm 37 is in contact with the second upper spindle 31 through a second arm roll shaft 38 mounted on the second tension arm 37, and the second upper tension rocker 33 is mounted with a second upper roker roll shaft 39 capable of moving along the second upper tension rocker 33; the second lower spindle 32 operates cooperatively with the second lower tension rocker 34 and the second guide roller 36, and the second lower tension rocker 34 is mounted with a second lower roker roll shaft 40 capable of moving along the second lower tension rocker 34; the second machine cabinet 30 is also mounted with a second upper guide wheel 41, a second lower guide wheel 42 and a second guide wheel set 43 connecting the second upper guide wheel 41 and the second lower guide wheel 42, the second upper guide wheel 41 is connected with the second upper roker roll shaft 39 through winding objects, and the second lower guide wheel 42 is connected with the second lower roker roll shaft 40 through winding objects; a second HMI operation screen 44 is also mounted on the second machine cabinet 30; the second guide wheel set 43 includes three guide wheels.

A hot-melt polyester tape of this Embodiment has the PET film layer and the hot-melt glue layer, and such hot-melt polyester tape is added with a layer of hot-melt glue compared to a conventional PET film, which makes it have higher extension capacity and not easy to break, the extension strength is much higher than the national standard, and the hot-melt polyester tape has the functions of waterproofing and reinforcement; the preparation method of the invention has effects of saving processes, ease of use, low production cost, improved benefit and stable quality, directly utilizes a multi-head winder or a single-head winder to parallel wind, and renders the resulting hot-melt polyester tape coil to have reduced volume and improved portability.

Embodiment 3

As shown in FIGS. 1 and 3, a hot-melt polyester tape comprises a PET film layer 1 which has a thickness of 15 μm, and one side of the PET film layer 1 is coated with a hot-melt glue layer 2 which has a thickness of 3 μm.

A preparation method of the hot-melt polyester tape comprises the steps:

1) putting the PET film on a PET film roller 14 of a dry laminating machine 13, drawing the PET film to allow one side of the PET film to pass through a glue bucket 15 containing liquid hot-melt glue layer, and smearing the PET film with the liquid hot-melt glue layer;

2) drying the PET film smeared with the liquid hot-melt glue layer obtained in the step 1) through a drying tunnel 16 of the dry laminating machine 13 to obtain a semi-finished product, wherein the drying tunnel 16 has 4 heating zones inside, in which the temperature of the first two heating zones is 65° C., and heaters in the latter two heating zones are turned off;

3) bringing the semi-finished product dried in the step 2) into a discharge shaft 17 to collect semi-finished product coils;

4) putting the semi-finished product coils obtained in the step 3) into a slitter 18 to slit to a desired width;

5) bringing the semi-finished product slit in the step 4) into a multi-head winder 19 to parallel wind into finished product coils;

6) putting the finished product coils below standard in the step 5) into a single-head winder 20 to unwind and then rewind parallel into finished product coils.

The multi-head winder 19 of the step 5) (see FIG. 4) includes a first machine cabinet 20, a plurality of first spindles 21 and a plurality of first reciprocating mechanisms 22 are mounted on the first machine cabinet 20, the first spindles 21 and the first reciprocating mechanisms 22 operate cooperatively, a first tension arm 23 is movably mounted on a movable channel of the first reciprocating mechanism 22, and the other end of the first tension arm 23 is in contact with the first spindle 21 through a first arm roll shaft 24 mounted on the first tension arm 23; the first machine cabinet 20 is also mounted with a plurality of first tension rockers 25 cooperatively used with the first spindles 21, and the first tension rockers 25 are mounted with first roker roll shafts 26 capable of moving along the first tension rockers 25; a plurality of first guide wheels 27 are mounted on the top of the first machine cabinet 29, and the first guide wheels 27 are connected with the first roker roll shafts 26 through winding objects; a first HMI operation screen 28 is also mounted on the first machine cabinet 29. The numbers of the spindles 21, the reciprocating mechanisms 22, the first tension rockers 25 and the first guide wheels 27 are the same.

The single-head winder 20 of the step 6) (see FIG. 5) includes a second machine cabinet 30, and the second machine cabinet 30 is mounted with a second upper spindle 31, a second lower spindle 32, a second upper tension rocker 33, a second lower tension rocker 34, a second reciprocating mechanism 35 and a second guide roller 36, the second upper spindle 31 operates cooperatively with the second upper tension rocker 33 and the second reciprocating mechanism 35, a second tension arm 37 is movably mounted on a movable channel of the second reciprocating mechanism 35, and the other end of the second tension arm 37 is in contact with the second upper spindle 31 through a second arm roll shaft 38 mounted on the second tension arm 37, and the second upper tension rocker 33 is mounted with a second upper roker roll shaft 39 capable of moving along the second upper tension rocker 33; the second lower spindle 32 operates cooperatively with the second lower tension rocker 34 and the second guide roller 36, and the second lower tension rocker 34 is mounted with a second lower roker roll shaft 40 capable of moving along the second lower tension rocker 34; the second machine cabinet 30 is also mounted with a second upper guide wheel 41, a second lower guide wheel 42 and a second guide wheel set 43 connecting the second upper guide wheel 41 and the second lower guide wheel 42, the second upper guide wheel 41 is connected with the second upper roker roll shaft 39 through winding objects, and the second lower guide wheel 42 is connected with the second lower roker roll shaft 40 through winding objects; a second HMI operation screen 44 is also mounted on the second machine cabinet 30; the second guide wheel set 43 includes four guide wheels.

A hot-melt polyester tape of this Embodiment has the PET film layer and the hot-melt glue layer, and such hot-melt polyester tape is added with a layer of hot-melt glue compared to a conventional PET film, which makes it have higher extension capacity and not easy to break, the extension strength is much higher than the national standard, and the hot-melt polyester tape has the functions of waterproofing and reinforcement; the preparation method of the invention has effects of saving processes, ease of use, low production cost, improved benefit and stable quality, directly utilizes a multi-head winder or a single-head winder to parallel wind, and renders the resulting hot-melt polyester tape coil to have reduced volume and improved portability.

What is claimed is:

1. A preparation method of the hot-melt polyester tape, comprising:
   1) putting a PET film on a roller of a dry laminating machine, drawing the PET film to allow one side of the PET film to pass through a glue bucket containing liquid hot-melt glue layer, and smearing the PET film with the liquid hot-melt glue layer;
   2) drying the PET film smeared with the liquid hot-melt glue layer obtained in the step 1) through a drying tunnel of the dry laminating machine to obtain a semi-finished product, wherein the drying tunnel has four heating zones inside, in which a temperature of the first two heating zones is 55-65° C., and heaters in the latter two heating zones are turned off;
   3) bringing the semi-finished product dried in the step 2) into a discharge shaft to collect semi-finished product coils;
   4) putting the semi-finished product coils obtained in the step 3) into a slitter to slit to a desired width;
   5) bringing the semi-finished product slit in the step 4) into a multi-head winder to parallel wind into finished product coils; and
   6) putting at least some of the finished product coils in the step 5) into a single-head winder to unwind and then rewind.

2. The preparation method of the hot-melt polyester tape according to claim 1, wherein: the multi-head winder in the step 5) includes a first machine cabinet, a plurality of first spindles and a plurality of first reciprocating mechanisms are mounted on the first machine cabinet, the first spindles and the first reciprocating mechanisms operate cooperatively, a first tension arm is movably mounted on a movable channel of the first reciprocating mechanism, and the other end of the first tension arm is in contact with the first spindle through a first arm roll shaft mounted on the first tension arm; the first machine cabinet is also mounted with a plurality of first tension rockers cooperatively used with the first spindles, and the first tension rockers are mounted with first roker roll shafts capable of moving along the first tension rockers; a plurality of first guide wheels are mounted on the first machine cabinet, and the first guide wheels are connected with the first roker roll shafts through winding objects; a first HMI operation screen is also mounted on the first machine cabinet.

3. The preparation method of the hot-melt polyester tape according to claim 2, wherein: the numbers of the first spindles, the first reciprocating mechanisms, the first tension rockers and the first guide wheels are the same.

4. The preparation method of the hot-melt polyester tape according to claim 2, wherein: the first guide wheels are mounted on the top of the first machine cabinet.

5. The preparation method of the hot-melt polyester tape according to claim 2, wherein: the single-head winder in the step 6) includes a second machine cabinet, and the second machine cabinet is mounted with a second upper spindle, a second lower spindle, a second upper tension rocker, a second lower tension rocker, a second reciprocating mechanism and a second guide roller, the second upper spindle operates cooperatively with the second upper tension rocker and the second reciprocating mechanism, a second tension arm is movably mounted on a movable channel of the second reciprocating mechanism, and the other end of the second tension arm is in contact with the second upper spindle through a second arm roll shaft mounted on the second tension arm, and the second upper tension rocker is mounted with a second upper roker roll shaft capable of moving along the second upper tension rocker; the second lower spindle operates cooperatively with the second lower tension rocker and the guide roller, and the second lower tension rocker is mounted with a second lower roker roll shaft capable of moving along the second lower tension rocker; the second machine cabinet is also mounted with a second upper guide wheel, a second lower guide wheel and a guide wheel set connecting the second upper guide wheel and the second lower guide wheel, the second upper guide wheel is connected with the second upper roker roll shaft through winding objects, and the second lower guide wheel is connected with the second lower roker roll shaft through winding objects; a second HMI operation screen is also mounted on the second machine cabinet.

6. The preparation method of the hot-melt polyester tape according to claim 5, wherein: the guide wheel set includes more than three guide wheels.

* * * * *